United States Patent [19]

Mussi et al.

[11] 4,425,082
[45] Jan. 10, 1984

[54] COMPOSITE HUB FOR A HELICOPTER ROTOR

[75] Inventors: Fiorenzo Mussi, Milan; Emilio Pariani, Cardano Al Campo, both of Italy

[73] Assignee: Costruzioni Aeronautiche Giovanni Agusta S.p.A., Italy

[21] Appl. No.: 337,442

[22] Filed: Jan. 6, 1982

[30] Foreign Application Priority Data

Feb. 5, 1981 [IT] Italy .............................. 67153 A/81

[51] Int. Cl.³ ............................................. B64C 11/06
[52] U.S. Cl. ................................. 416/61; 416/134 A; 416/244 R
[58] Field of Search .......... 416/134 A, 230 A, 244 R, 416/141, 61

[56] References Cited

U.S. PATENT DOCUMENTS

| | | | |
|---|---|---|---|
| 3,384,185 | 5/1968 | Fernandez | 416/244 |
| 4,106,332 | 8/1978 | McKeown | 416/61 |
| 4,156,583 | 5/1979 | Mayerjak | 416/134 A |
| 4,257,738 | 3/1981 | Schwarz et al. | 416/134 A |
| 4,293,276 | 10/1981 | Brogdon | 416/134 A |
| 4,342,540 | 8/1982 | Lovera et al. | 416/141 |

*Primary Examiner*—Stephen Marcus
*Assistant Examiner*—Brian J. Bowman
*Attorney, Agent, or Firm*—Kane, Dalsimer, Kane, Sullivan and Kurucz

[57] ABSTRACT

A composite hub for a helicopter rotor, the hub having the form of a flat plate of laminated structure provided with a plurality of through holes each able to house an elastomeric coupling for connection of an associated blade, and a central layer of the said plate being constituted by a force distributor element in contact with each surface of which there is disposed at least one layer constituted by radial elements extending outwardly of an axis of rotation of the hub and an annular element disposed in contact with the free ends of the said radial elements; these latter being connected to the radial elements disposed on the other side of the distributor element by means of axial elements (25) defining part of the surface of the said aperture.

6 Claims, 4 Drawing Figures

COMPOSITE HUB FOR A HELICOPTER ROTOR

BACKGROUND OF THE INVENTION

The present invention relates to a hub for a helicopter rotor which can support a plurality of blades connectable to the hub itself by means of associated elastomeric couplings.

In helicopter rotors it is known to utilize hubs constituted by a flat plate having in plan a substantially regular polygonal from the number of sides of which, normally four, is equal to the number of blades to be supported. The said flat plate is normally constituted by a single plate of metal material or else of laminated synthetic material which is provided, near each of its corners, with a through hole which is closed on the outside by a peripheral arm or bridge. Each blade is normally provided with an attachment bracket which extends through an associated through hole of the said plate and is supported by the associated bridge with the interposition of a resilient block, normally of frustoconical form, disposed with its axis coplanar to the said plate and directed towards an axis of rotation of the rotor.

From what has been described above it is apparent that all the forces transmitted from the hub to the blade and all the forces applied by the blades to the hub pass through the said peripheral arms or bridges the points of connection of which with the remaining parts of the hub are certainly the most stressed points of the hub itself. In particular, the concentration of forces which occurs at the ends of the said bridges is normally such as to require relatively great thicknesses of material for their absorption.

A first disadvantage of the known hubs described above is constituted by the fact that the material used is, in general, only just sufficient at the points of greatest force concentration and certainly stronger than is required at all other points. This means, obviously, a reduction in the "payload" for an installation of the same power.

A further disadvantage of the known hubs described above lies in the fact that the substantially monolithic structure of the hubs themselves favours the propagation of possible cracks.

SUMMARY OF THE INVENTION

The object of the present invention is that of providing a hub the structure of which shall be such as to convey the forces applied to it along predetermined flow lines in such a way as to minimize the structural sections, for the same strength, and, therefore, the weight, and to avoid the risk that possible cracks should propagate throughout the structure causing it to collapse.

The said object is achieved by the present invention in that it relates to a composite hub for a helicopter rotor in the form of a flat plate having a plurality of peripheral through holes uniformly distributed about a central axis of rotation of the said rotor, each said aperture being able to house an elastomeric coupling for connection of an associated blade; characterized by the fact that the said plate has a laminated structure including a force distribution element constituting a flat central layer of the said structure; a plurality of radial leaf elements disposed on either side of the said distributor element and lying in planes perpendicular to the said axis of rotation, the said radial elements extending radially outwardly from this latter; an annular leaf element positioned on each side of the said distributor element and extending in contact with the free ends of the associated plurality of said radial elements in a plane perpendicular to the said axis of rotation; and a plurality of axial leaf elements each extending parallel to the said axis of rotation and in contact with the said distributor element and associated said radial elements.

BRIEF DESCRIPTION OF THE DRAWINGS

Further characteristics and advantages of the present invention will become apparent from the following description with reference to the attached drawings, which illustrates a non-limitative embodiment, in which.

DETAILED DESCRIPTION OF THE INVENTION

Figure 1:
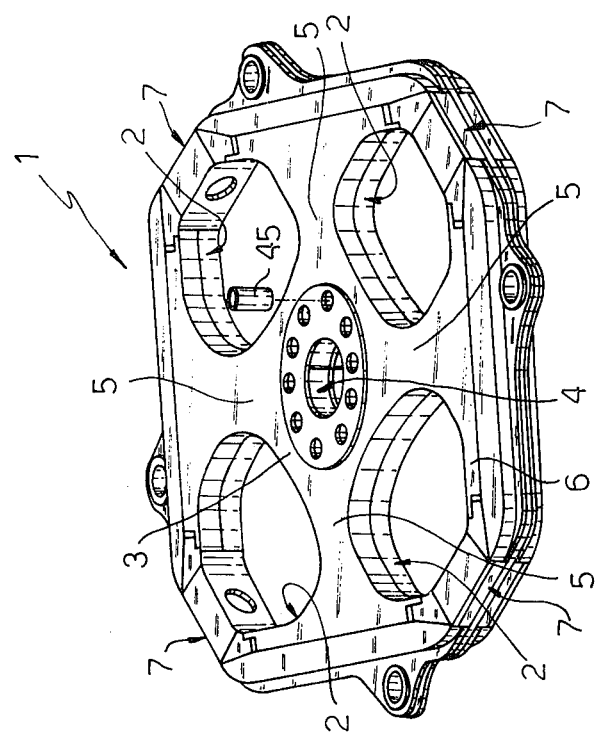
FIG. 1 is a perspective view of a hub formed according to the principles of the present invention.

In FIG. 1 there is illustrated a hub of a helicopter rotor constituted by a flat plate 1 having, in plan, a substantially square form with beveled corners. The plate 1 is provided adjacent each corner with a through hole 2 able to house a resilient block (not illustrated) known per se and constituting an elastomeric coupling for connection of an associated blade (not illustrated) to the plate 1 itself.

The apertures 2 are uniformily distributed about a central axis of rotation of the plate 1 and define thereon a central body 3 having a central through hole 4 coaxial with the said axis of rotation and able to be engaged by a drive shaft, (not illustrated). The apertures 2 further define on the plate 1 four radial arms 5 extending radially outwardly from the central body 3, and an outer frame 6 including four bridges 7 each extending between the ends of an associated pair of adjacent radial arms 5 to close the outer side of an associated aperture 2.

Figure 4:
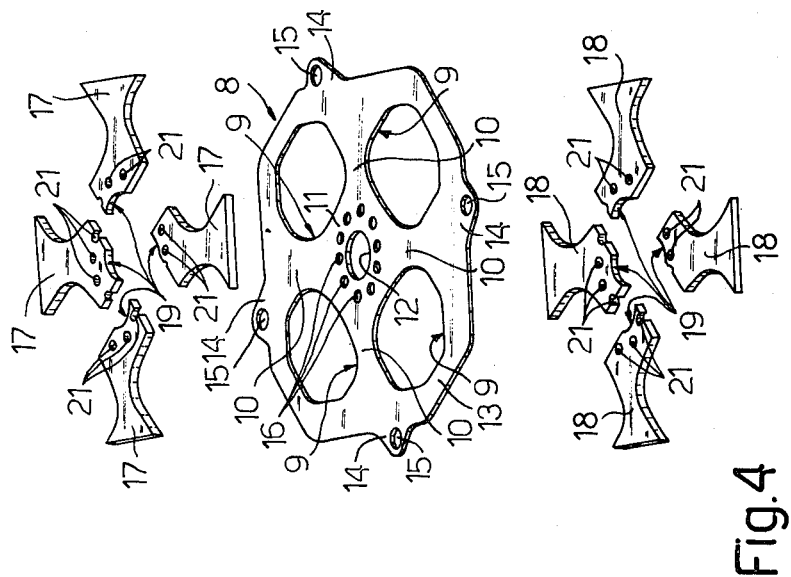
FIG. 4 is an exploded perspective view of a second sub-assembly of the hub of FIG. 1 illustrated in FIG. 3.

As illustrated in FIG. 4 the plate 1 includes a central leaf element 8 constituted by a layer of fibre reinforced resin. The element 8 has a substantially identical plan form to that of the plate 1 and is provided with four through holes 9 coinciding with the apertures 2 and defining four radial arms 10 on the element 8. These latter are connected together at their radially inner ends by a central body 11 having a central through hole 12 defining a central portion of the hole 4, and at their radially outer ends by a substantially square annular frame 13 from which four ears 14 project outwardly, each ear having a through hole 15. A ring of through holes 16 is formed about the through hole 12.

The fibres, not illustrated, embedded within the resin constituting the element 8 are preferably orientated along two orthogonal axes each of which is substantially parallel to a pair of opposite sides of the frame 13.

In contact with the opposite surfaces of the element 8 there are provided two pluralities of radial elements or spokes the upper of which are indicated 17 and the lower indicated 18.

Each of the radial spokes 17,18 is constituted by a plate of fibre-reinforced resin (the fibres of which are not illustrated) preferably disposed along two orthogonal directions one of which is parallel to the axis of the associated radial spoke, which is limited at one end by a curved surface 19 defining, together with the surface 19 of the other spokes, a circular hole 20 (FIG. 3) constituting a portion of the hole 4 and centrally located with respect to a central body from which the spokes extend radially outwardly. Each spoke 17,18 is traversed by a plurality of through holes 21 aligned with corresponding through holes 16 of the element 8.

Figure 2:
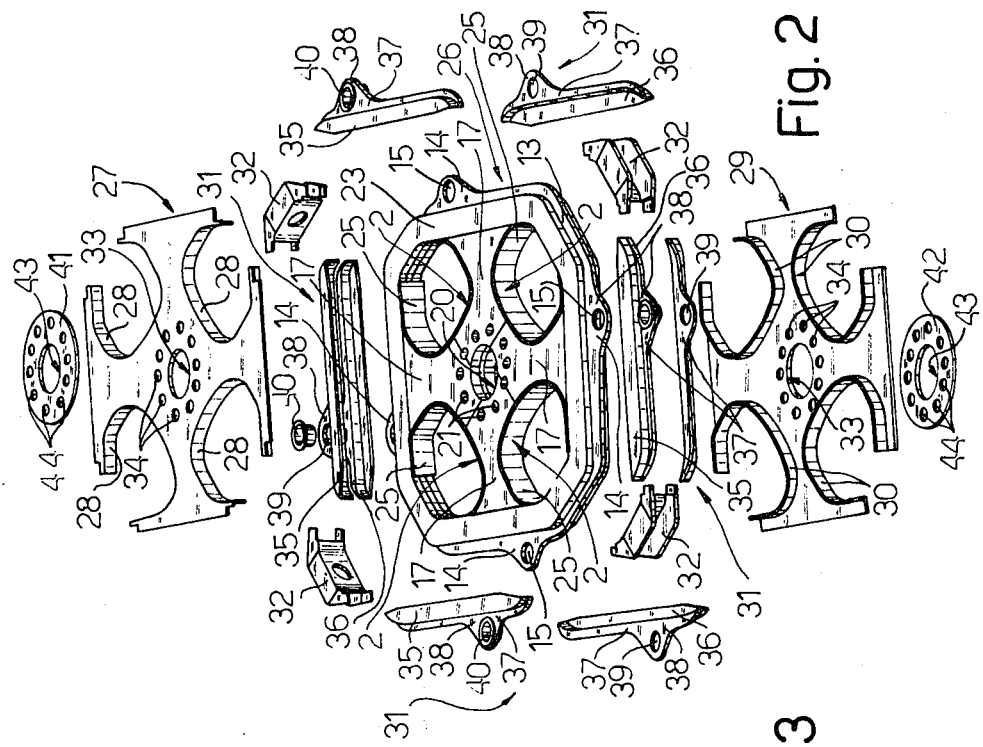
FIG. 2 is an exploded perspective view of the hub of FIG. 1.
Figure 3:
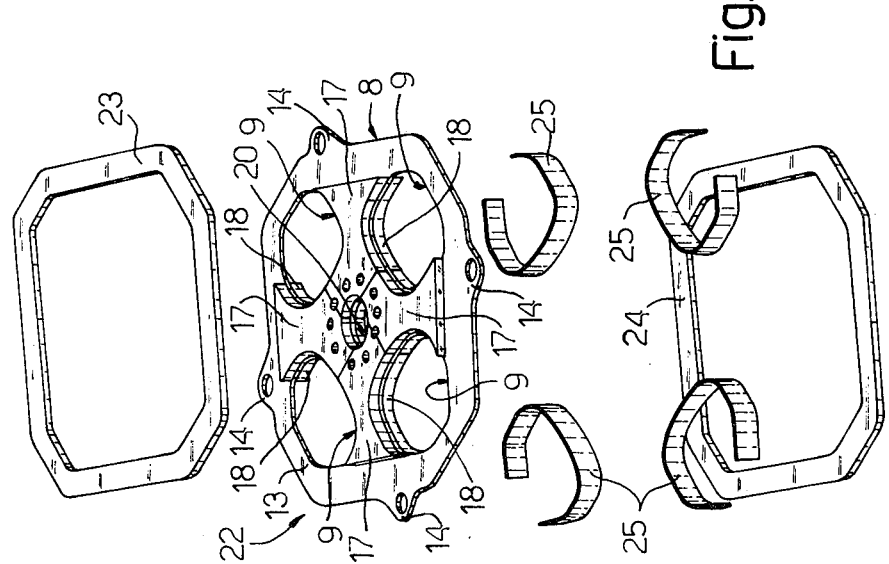
FIG. 3 is an exploded perspective view of a first sub-assembly of the hub of FIG. 1 illustrated in FIG. 2.

As illustrated in FIG. 3, the assembly of the element 8 and the spokes 17 and 18 constitutes a sub-assembly 22 of the plate 1 which is completed by the addition of an upper annular element 23, a lower annular element 24 and four axial elements 25 to form a further sub-assembly indicated 26 in FIG. 2.

The annular elements 23 and 24 are each constituted by a strip of resin reinforced with fibre (not illustrated) preferably uni-directional and parallel to the longitudinal axis of the strip itself. The annular elements 23 and 24 are located in contact with the opposite surfaces of the frame 13 in such a way as to cover these at least over an outer peripheral zone including the ears 14. Along their inner perimeter the annular elements 23 and 24 are located respectively in contact with the outer ends of the spokes 17 and 18.

Each axial element 25 is constituted by a collar folded substantially into a C-shape formed by means of a tape of resin reinforced with fibres (not illustrated) which are preferably orientated along two orthogonal directions forming angles of about 45° with the axis of rotation of the plate 1. Each axial element 25 is inserted through a respective aperture 9 of the element 8 and is located in contact with this latter and with the lateral edges of the spokes 17 and 18 surrounding the said aperture 9 in such a way as to define the parts of the surface of the associated aperture 2 (FIG. 1) facing the related bridge 7 (FIG. 1).

As illustrated in FIG. 2, the plate 1 of FIG. 1 is obtained starting from the sub-assembly 26 of FIG. 2 by adding to this latter an upper cover 27 provided with half collars 28 axially inserted into the apertures 2 in contact with the associated axial elements or collars 25, and a lower cover 29 provided with half collars 30 axially inserted into the apertures 2 in contact with the associated collars 25 to cover these, together with the half collars 28. To the sub-assembly 26 there are further added four lateral covers 31 each covering a respective ear 14 and the part of the frame 13 adjacent thereto and projecting out from the annular elements 23 and 24, and four U-shape metal brackets 32 positioned with their concavity facing outwardly and astride the annular elements 23 and 24, each in correspondence with a respective aperture 2 to define a respective bridge 7 (FIG. 1).

The covers 27 and 29 have in plan the form of the assembly respectively formed by the spokes 14 and 18, and are each provided with a central hole 33 which is coaxial with the holes 20. Each hole 33 constitutes an outer section of the hole 4 (FIG. 1) and is surrounded by a ring of holes 34 which are coaxial with the respective holes 21 of the spokes 17 and 18.

The covers 27 and 29 are preferably made of a resin-bonded fabric the thickness of which is relatively reduced as compared with that of the other layers constituting the plate 1.

Each lateral cover 31 is composed of an upper half cover 35 and a lower half cover 36 each of which covers a section of the associated annular element 23 and has a flange 37 located in contact with the frames 13. Each flange 37 has an ear 38 provided with a hole 39 coaxial with a respective hole 15 and engaged, together with this latter and the hole 39 of the other flange 37, by a metal cup 40 defining a seat for a ball (not illustrated) of a ball joint (not illustrated) for connecting the plate 1 to a shock absorber (not illustrated) interposed between the plate 1 and each blade (not illustrated) connected to it.

In contact with the covers 27 and 29 there are arranged two circular attachment plates 41 and 42 each of which has an axial hole 43 coaxial with the hole 4 (FIG. 1) and surrounded by a ring of holes 44 coaxial to the holes 21.

Each hole 44 of the plate 41 is connected to the corresponding hole 44 of the plate 42 by means of a metal bush 45 (FIG. 1) extending through a first hole 34 formed in the cover 27, a first hole 21 formed in a spoke 17, a hole 16, a second hole 21 formed in a spoke 18, and a second hole 31 formed in the cover 29.

Obviously, all the elements constituting the plate 1 which are made of resin can be polymerized together in such a way as to confer a monolithic structure on this latter.

From an observation of the plate 1 it is possible to note how all its component elements have been designed in such a way as to be optimally resistent to a given type of force, and how the said component elements are able as an assembly to absorb all the forces applied to the plate 1 thereby eliminating the possibility that at various points thereof there could arise dangerous concentrations of forces.

In particular, there are normally applied to the plate 1 a drag couple and a driving couple, lift forces and radial centrifugal forces. These moments and these forces, at least the radial centrifugal forces which are applied directly by the brackets 32 to the annular elements 23 and 24 are transmitted to the central element 8 which serves as a force distributor. A first part of these forces, in particular the forces due to the driving and drag couples acting in the plane of the plate 1 are absorbed by the spokes 17 and 18 together with the forces due to moments generated by shear parallel to the axis of rotation, and due to lift.

A second part of the said forces, in particular the shear forces directed parallel to the axis of rotation, are absorbed by the axial elements 25 and transferred to the covers 27 and 29 through the half collars 28 and 30. The covers 27 and 29, given that they are relatively fragile, tend to fracture before the other component elements of the plate 1 and serve as visible indicator elements of a possible state of deterioration of the plate 1.

Finally, as previously mentioned, a further part of the forces due to the radial centrifugal forces is directly absorbed by the uni-directional tapes constituting the annular elements 23 and 24.

We claim:

1. A composite hub for a helicopter rotor in the form of a flat plate (1) having a plurality of apertures (2) uniformily peripherally distributed about a central axis of rotation of the said rotor, each said aperture (2) being able to house an elastomeric coupling for connection to an associated blade; characterized by the fact that the said plate (1) has a laminated structure including a force distributor element (8) constituting a central flat layer of the plate; a plurality of radial leaf elements (17, 18) disposed on each side of the said distributor element (8) and lying in planes perpendicular to the said axis of rotation, the said radial leaf elements (17, 18) extending radially outwardly therefrom; annular leaf elements (23, 24) disposed on each side of the said distributor element (8) and extending in contact with the free end of the associated plurality of said radial leaf elements (17, 18) in a plane perpendicular to the said axis of rotation; and a plurality of axial leaf elements (25) each extending parallel to the said axis of rotation and in contact with the said distributor element (8) and associated said radial leaf elements (17, 18), each of said axial leaf elements (25) constituting a substantially C-shaped collar positioned around one of said apertures (2) with its concavity facing outwardly to partially define an inner surface of said one of said apertures (2).

2. A hub according to claim 1, characterized by the fact that the said distributor element (8) has a plan form substantially the same as that of the said plate 1.

3. A hub according to claim 1, characterized by the fact that each plurality of said radial leaf elements (17,18) defines a central body substantially coaxial to the said axis of rotation and a plurality of spokes extending radially from the said central body towards an inner periphery of the associated annular element (23,24).

4. A hub according to claim 1, characterized by the fact that the said distributor element (8) has a plurality of radial projections (14) each provided with a seat (40) for a ball joint.

5. A hub according to claim 1, characterized by the fact that it further includes fracture detector means (27,29) coupled to the said axial elements.

6. A hub according to claim 5, characterized by the fact that the said fracture detector means include two half covers (27, 29) disposed on opposite sides of the said distributor element (8) outside the said radial leaf elements (17, 18) and facing one another; each half cover (27, 29) being constituted by a relatively thin textile disposed in contact with the associated plurality of radial leaf elements (17, 18) and including a plurality of lateral wall segments (28, 30) each extending in contact with a part of a concave lateral surface of one of said axial leaf elements (25).

* * * * *